US008615124B2

(12) United States Patent
Faulkner et al.

(10) Patent No.: US 8,615,124 B2
(45) Date of Patent: Dec. 24, 2013

(54) COMPARISON OF OPTICAL AND MAGNETIC CHARACTER DATA FOR IDENTIFICATION OF CHARACTER DEFECT TYPE

(75) Inventors: Bill Faulkner, Waterloo (CA); Dmitri Eidenzon, Waterloo (CA)

(73) Assignee: RDM Corporation, Waterloo (CA)

( * ) Notice: Subject to any disclaimer, the term of this patent is extended or adjusted under 35 U.S.C. 154(b) by 0 days.

(21) Appl. No.: 13/445,432

(22) Filed: Apr. 12, 2012

(65) Prior Publication Data

US 2013/0101200 A1    Apr. 25, 2013

Related U.S. Application Data

(63) Continuation of application No. 12/659,024, filed on Feb. 23, 2010, now Pat. No. 8,180,137.

(51) Int. Cl.
    *G06K 9/00* (2006.01)
(52) U.S. Cl.
    USPC ............................. 382/139; 382/209; 358/301
(58) Field of Classification Search
    None
    See application file for complete search history.

(56) References Cited

U.S. PATENT DOCUMENTS

| | | | | |
|---|---|---|---|---|
| 4,685,141 A * | 8/1987 | Hoque et al. | ................... | 382/138 |
| 4,747,058 A * | 5/1988 | Ho | ................... | 700/225 |
| 4,947,321 A * | 8/1990 | Spence et al. | ................... | 705/45 |
| 5,077,805 A * | 12/1991 | Tan | ................... | 382/137 |
| 5,097,517 A * | 3/1992 | Holt | ................... | 382/137 |
| 5,208,869 A * | 5/1993 | Holt | ................... | 382/138 |
| 5,504,822 A * | 4/1996 | Holt | ................... | 382/218 |
| 6,097,834 A * | 8/2000 | Krouse et al. | ................... | 382/137 |
| 6,137,967 A * | 10/2000 | Laussermair et al. | ................... | 399/16 |
| 6,195,453 B1* | 2/2001 | Simonoff | ................... | 382/137 |
| 6,243,504 B1* | 6/2001 | Kruppa | ................... | 382/318 |
| 6,324,353 B1* | 11/2001 | Laussermair et al. | ................... | 399/16 |
| 6,986,464 B2* | 1/2006 | Takiguchi et al. | ................... | 235/449 |
| 7,092,561 B2* | 8/2006 | Downs, Jr. | ................... | 382/139 |
| 7,587,079 B2* | 9/2009 | Marlett et al. | ................... | 382/139 |
| 7,657,093 B2* | 2/2010 | Shizuka et al. | ................... | 382/182 |
| 7,680,317 B2* | 3/2010 | Adelberg et al. | ................... | 382/139 |
| 7,680,318 B2* | 3/2010 | Agrawal et al. | ................... | 382/139 |
| 7,702,143 B2* | 4/2010 | Adelberg et al. | ................... | 382/139 |
| 2004/0217170 A1* | 11/2004 | Takiguchi et al. | ................... | 235/449 |
| 2005/0281449 A1* | 12/2005 | Takiguchi | ................... | 382/139 |
| 2005/0286752 A1* | 12/2005 | Takiguchi | ................... | 382/139 |
| 2006/0102721 A1* | 5/2006 | Goetz | ................... | 235/440 |
| 2007/0172109 A1* | 7/2007 | Agrawal et al. | ................... | 382/139 |
| 2011/0096368 A1* | 4/2011 | Maher et al. | ................... | 358/3.28 |

* cited by examiner

*Primary Examiner* — Manav Seth
(74) *Attorney, Agent, or Firm* — Grant Tisdall; Gowling Lafleur Henderson LLP

(57) ABSTRACT

A system for determining a plurality of PCS values for a document image representing a document having at least one area of interest on a surface of the physical item for containing critical data and a background image positioned on the surface, the document suitable for positioning in a digital image recorder, the system determines from the memory a plurality of PCS threshold values having specified surface locations matching the assigned locations of the calculated PCS values and compares the PCS threshold values with the calculated PCS values to determine whether the target portions satisfy their respective PCS threshold values; wherein the degree of target portions that satisfy their PCS threshold value is indicative of the acceptability of the design of the background image when processed by the digital image recorder.

12 Claims, 7 Drawing Sheets

COMPARISON OF OPTICAL AND MAGNETIC CHARACTER DATA FOR IDENTIFICATION OF CHARACTER DEFECT TYPE

CROSS-REFERENCE TO RELATED APPLICATIONS

This application is a continuation application of U.S. application Ser. No. 12/659,024, filed Feb. 23, 2010, now U.S. Pat. No. 8,280,137 all of which is hereby incorporated by reference herein in its entirety.

FIELD OF INVENTION

The present invention relates to image processing of paper documents.

BACKGROUND

The printing process is one small part of the total quality control procedure for a MICR printing system user. Quality and accuracy of the check documents must be closely controlled during printing to prevent problems from occurring when the document is processed off-site. The MICR line is the line of machine readable information that is printed at the bottom of each check. Financial institutions are dependent on the accuracy and integrity of the data in this line. Unlike the fixed elements of the form, the MICR line must be printed using magnetic ink and a special MICR font, such as E13B or CMC7.

Under current law, a bank may send the original paper check for payment unless it has an electronic payment agreement with the paying bank. Under Check 21 legislation in the United States, by authorizing the use of a new negotiable instrument called a "substitute check" (aka image replacement document), electronic check processing is enabled without mandating that any bank change its current check collection practices. The substitute check is a paper reproduction of an original check that contains an image of the front and back of the original check, which is suitable for automated processing in the same manner as the original check, as long as the check image meets other technical requirements, such as having mandated image quality, otherwise referred to as image readiness that includes acceptable print contrast between the check background and any critical data (e.g. signatures, printed amounts, etc.) placed over the background.

As a result of Check 21, banks that wish to scan the original paper check to create a substitute check require it to satisfy not only MICR character requirements but also print contrast signal (PCS) standards with respect to the check background. Print contrast acceptability is the design attribute of a check that ensures optimum recognition of amounts, legibility of handwriting, MICR character capture optically, and reasonably low file size that are positioned overtop of any background design images on the surface of the check.

When designing MICR documents, it is critical to remember that the document acts as a vehicle to transfer money from one party to another. The MICR document must clearly communicate the information required to complete that transfer, without interference from colorful backgrounds or confusing layout. Digital image capture, processing, and storage for the entire check make this requirement more important. Work is in progress to make the digital image of a check legally binding when captured and processed by banks. This is necessary to permit truncation of the paper documents early in processing and eliminate the cost of transporting the paper to the issuing bank. Checks should be designed to be easily interpreted when digitized into black and white images. MICR documents are not the only documents in which readability is a concern. Many payment processing systems are designed to use an OCR-printed turnaround document to direct a check based payment. In these cases, readability of the OCR line may be compromised if the document is printed using magnetic ink. The processing system detect checks by the presence of magnetic ink and initiate an E13B font recognition routine. If the turnaround document is magnetic, failure to read would result. Therefore, MICR printers are not recommended when an OCR font is used for data collection.

The smoothness of paper used on which to print the MICR characters can impact image quality. With increasing roughness, the print quality of solids and halftones degrades. Extremely rough paper does not properly accept fused dry ink, which rubs or flakes off. Rough papers require a higher density setting and more ink than smooth papers to achieve the desired level of image darkness, because surface irregularities must be filled in with ink. In this case, the amount of magnetic ink used to print the MICR characters can also be irregular.

Further, it is recognised that quality control of the MICR characters, for each MICR symbol, is also impacted by any variability or non-standard numbers or spaces between those symbols, which must be properly registered so that the fields do not flow into one another.

Further, each MICR symbol and character has an ideal waveform and nominal signal strength. Every MICR printing technology modifies the waveform from the ideal in a different way, so that the nominal MICR signal varies somewhat among the characters and symbols. These variations from the norm are characteristics of the printing technology and font design If a MICR quality issue arises, it can be visible on the printed document. Even signal strength problems can be seen if prints are compared. Low signal characters are thin and poorly formed; high signal characters are fat and usually surrounded by xerographic background. However, occasionally, problems are reported by test equipment, but no problem is visible. This is usually due to improper use of intelligent magnetic test equipment, which evaluates optical specifications using magnetic waveforms. Equipment vendors are aware of the limitations of their products, and therefore recommend visual inspection of suspected characters. Some users, however, misinterpret these findings as specifications failures. It is important to understand the differences between optical and magnetic measurements and why all ANSI standards for MICR character dimensions can be evaluated optically only.

Further, MICR signal strength is measured magnetically, along with uniformity and spots, and is specified numerically as 50 to 200 percent of nominal. Waveform uniformity is not specified numerically, but as an indicator for visual inspection. Spots are categorized as magnetic or non-magnetic, because different size allowances apply. No other specifications are measured magnetically. Any MICR failures other than signal strength must be confirmed optically. However, it is recognized that the magnetic waveform test may pass the magnetic signal strength criteria but are actually contain poorly printed (e.g. too short, too narrow, improper spacing, too light, etc.) characters in those cases where the magnetic ink may be of sufficient metal oxide content/strength to mask those visual deficiencies.

Accordingly, it is recognised in the industry that one must identify the source of the problem for MICR character reading errors before one can implement corrective actions. For document quality problems, one can best identify the cause by examining the rejected document and determining the most likely reason for rejection. However, rejected documents may not be available, or they may not visibly show any printer or application-related issues.

SUMMARY

There is a need for a method and a system for paper document test system and method that overcomes or otherwise mitigates at least one of the above-presented disadvantages of the prior art.

It is recognised in the industry that one must identify the source of the problem for MICR character reading errors before one can implement corrective actions. For document quality problems, one can best identify the cause by examining the rejected document and determining the most likely reason for rejection. However, rejected documents may not be available, or they may not visibly show any printer or application-related issues. Contrary to present testing apparatus and methods there is provided a method and apparatus for testing a magnetic ink character recognition (MICR) character printed on a document for compliance with a character standard. The method comprises obtaining a location associated with the MICR character on the document; obtaining a magnetic signal data indicative of dimensional features of the MICR character associated with the location; obtaining optical image data indicative of the dimensional features of the MICR character associated with the location; comparing the magnetic signal data against a plurality of magnetic signal templates and failing to determine a matching character of the MICR character, such that each of the plurality of magnetic signal templates is associated with a unique character of a set of characters; comparing the optical image data against a plurality optical image templates to determine the matching character of the MICR character; and determining at least one optical defect of the dimensional features of the matching character from the optical image data indicative of the failure to determine the matching character by the comparison of the magnetic signal data; wherein the optical image data and the magnetic signal data are obtained from corresponding readers located in the same housing.

A first aspect provided is a method for testing a magnetic ink character recognition (MICR) character printed on a document for compliance with a character standard, the method comprising the steps of: obtaining a location associated with the MICR character on the document; obtaining a magnetic signal data indicative of dimensional features of the MICR character associated with the location; obtaining optical image data indicative of the dimensional features of the MICR character associated with the location; comparing the magnetic signal data against a plurality of magnetic signal templates and failing to determine a matching character of the MICR character, such that each of the plurality of magnetic signal templates is associated with a unique character of a set of characters; comparing the optical image data against a plurality optical image templates to determine the matching character of the MICR character; and determining at least one optical defect of the dimensional features of the matching character from the optical image data indicative of the failure to determine the matching character by the comparison of the magnetic signal data; wherein the optical image data and the magnetic signal data are obtained from corresponding readers located in the same housing.

A further aspect provided is a method for testing a magnetic ink character recognition (MICR) character printed on a document for compliance with a character standard, the method comprising the steps of: obtaining a location associated with the MICR character on the document; obtaining a magnetic signal data indicative of dimensional features of the MICR character associated with the location; obtaining optical image data indicative of the dimensional features of the MICR character associated with the location; comparing the optical image data against a plurality of optical image templates and failing to determine a matching character of the MICR character, such that each of the plurality of optical image templates is associated with a unique character of a set of characters; comparing the magnetic signal data against a plurality magnetic signal templates to determine the matching character of the MICR character; and determining at least one magnetic signal defect of the dimensional features of the matching character from the magnetic signal data indicative of the failure to determine the matching character by the comparison of the optical image data; wherein the optical image data and the magnetic signal data are obtained from corresponding readers located in the same housing.

A further aspect provided is an apparatus for testing a magnetic ink character recognition (MICR) character printed on a document for compliance with a character standard, the apparatus comprising: a housing; a location module to obtain a location associated with the MICR character on the document associated with a document transport mechanism in the housing for providing relative movement between a plurality of readers and the document; a magnetic reader of the plurality of readers in the housing to obtain a magnetic signal data indicative of dimensional features of the MICR character associated with the location; an optical reader of the plurality of readers in the housing to obtain optical image data indicative of the dimensional features of the MICR character associated with the location; a magnetic module to compare the magnetic signal data against a plurality of magnetic signal templates and failing to determine a matching character of the MICR character, such that each of the plurality of magnetic signal templates is associated with a unique character of a set of characters; an optical module to compare the optical image data against a plurality optical image templates to determine the matching character of the MICR character; and a correlation module to determine at least one optical defect of the dimensional features of the matching character from the optical image data indicative of the failure to determine the matching character by the comparison of the magnetic signal data; wherein the optical image data and the magnetic signal data are obtained from the corresponding readers located in the same housing.

A still further aspect provided is an apparatus for testing a magnetic ink character recognition (MICR) character printed on a document for compliance with a character standard, the apparatus comprising: a housing; a location module to obtain a location associated with the MICR character on the document associated with a document transport mechanism in the housing for providing relative movement between a plurality of readers and the document; an optical reader of the plurality of readers in the housing to obtain optical image data indicative of the dimensional features of the MICR character associated with the location and to compare the optical image data against a plurality of optical image templates and failing to determine a matching character of the MICR character, such that each of the plurality of optical image templates is associated with a unique character of a set of characters; a magnetic reader of the plurality of readers in the housing to obtain a magnetic signal data indicative of dimensional features of the MICR character associated with the location and to compare the magnetic signal data against a plurality magnetic signal templates to determine the matching character of the MICR character; and a correlation module to determine at least one magnetic signal defect of the dimensional features of the matching character from the magnetic signal data indicative of the failure to determine the matching character by the comparison of the optical image data; wherein the optical image data and the magnetic signal data are obtained from the corresponding readers located in the same housing.

BRIEF DESCRIPTION OF THE DRAWINGS

These and other features will become more apparent in the following detailed description in which reference is made to the appended drawings by way of example only, wherein.

DESCRIPTION

Figure 1:
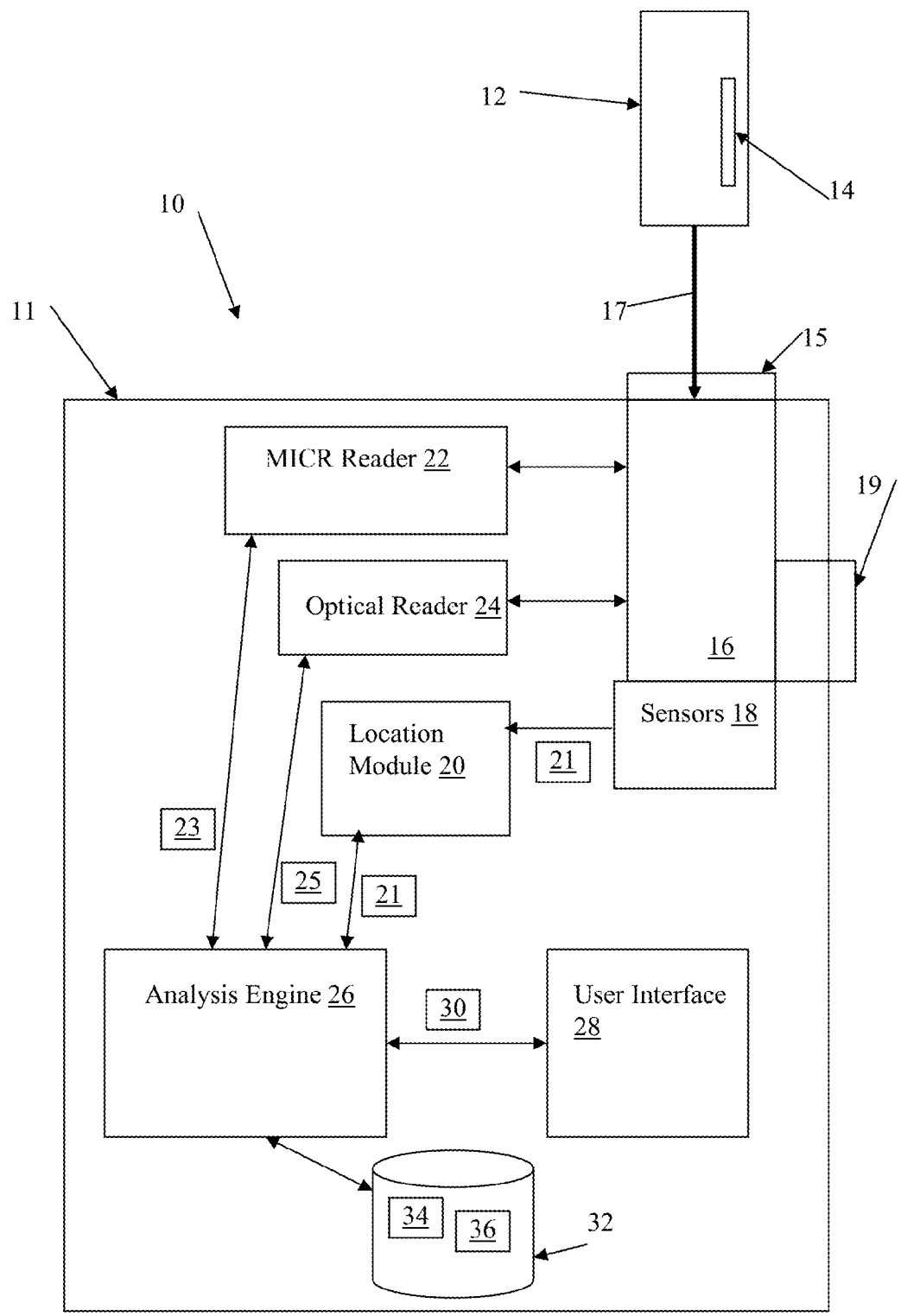
FIG. 1 shows an example testing apparatus for documents containing MICR data.

Referring to FIG. 1, shown is a reader apparatus 10 configured to read a paper document 12 having one or more printed Magnetic Ink Character Recognition, or MICR, characters 14. The reader apparatus 10 has a document transport mechanism 16 (e.g. a series of drive rollers, gears, belts, etc. configured to direct/transport the document 12) for physically translating the document 12 past a MICR reader 22 configured for identifying a magnetic waveform 200 (see FIG. 3) and other magnetic characteristics 23 of each MICR character 14 and an optical reader 24 configured for identifying a digitized image 25 of each MICR character 14, as well as optionally the remaining printed elements 13 (see FIG. 4) of the document 12, as further described below.

The document transport mechanism 16 can include, for example, a single pass document track such that the document transport mechanism 16 conveys the document 12 past the two readers 22, 24 in a single pass. Alternatively, the document transport mechanism 16 located within a base housing 11 of the apparatus 10 can include a plurality of reader devices 22,24 and a multi-pass document track, which conveys the document 14 through the multi-pass document track and past the plurality reader devices 22,24. The reader devices 22,24 perform operations on the document 12, such that the document transport mechanism 16 receives 17 a document 12 from an input slot 15, routes the document 14 multiple consecutive times through the multi-pass document track, and then directs the document 12 to an output slot 19. The plurality of reader devices 22,24 includes the magnetic ink character recognition (MICR) reader 22 and the image reader 24 (e.g. camera or scanner) positioned sufficiently close to each other along the multi-pass document track, such that the MICR device 22 operates during a first pass of the document 12 through the multi-pass document track and the image reader 24 operates during a subsequent pass of the document 12 through the multi-pass document track of the document transport mechanism 16.

It is also recognised that the transport mechanism 16 could be configured to translate the readers 22,24 over the surface of a stationary document 12. It is also recognised that the transport mechanism 16 could be configured to translate the readers 22,24 over the surface of a moving document 12. In any event, it is recognised that the transport mechanism 16 is configured to provide relative movement between the surface 113 (see FIG. 4) of the document 12 and the readers 22,24.

The apparatus 10 also has one or more sensors 18 (e.g. presence sensing, position/location sensing, transport rate/speed sensing, timing, etc.) coupled to the document transport mechanism 16 for recording and providing location information 21 of each character 14 when read by each of the readers 22,24, such that an analysis engine 26 can use the location information 21 for each of the read characters 14 to match the MICR information 23 with the optical information 25 that both correspond to the same character 14, as further described below.

In other words, the potential character 14 read by one reader 22 is correlated as the same character 14 read by the other reader 24 using the location information 21. The location information 21 can be provided by locations sensors 18 and/or by using travel rate sensors 18 and/or time sensors 18 and/or presence sensors 18 to provide the location information 21 used to correlate the magnetic signal data 23 with the optical image data 25 as associated with the same potential character 14 and/or grouping of characters 14 (e.g. the data 23,25 indicating not just the characters 14 themselves but also the spacing between adjacent characters 14).

Referring again to FIG. 1, the apparatus 10 also has a database 32 containing optical patterns 34 representing respective optical patterns having predefined optical characteristics of the characters 14 and magnetic patterns 36 representing respective magnetic patterns (e.g. waveforms 200) having predefined magnetic characteristics of the characters 14. Each of the patterns 34 are used by the analysis engine 26 (and/or by the individual readers 24) to optically recognise the recorded characters 14 in the optical information 25 and each of the patterns 36 are used by the analysis engine 26 (and/or by the individual readers 24) to magnetically recognise the recorded characters 14 in the magnetic information 23, as further described below. Differences between the information 23,25 are compared by the analysis engine 26 for each of the respective characters 14 to determine whether defects in the characters 14 is a consequence of errors in the magnetic properties of the characters 14, errors in the visual/optical properties of the characters 14, or a combination thereof, as further described below. The apparatus 28 also has a user interface 28 for displaying comparison information 30 or any other analysis information 30 generated by the analysis engine 26 based on the compared information 21,23,25, as further described below.

It is recognised that the reader 22 and the reader 24 can be configured to read the characters 14 in sequential fashion, for example where a character 14 is first read by the reader 22 and then read by the reader 24 or the character 14 is first read by the reader 24 and then read by the reader 24. In this sequential example, the sensor information 18 for the first read operation (by reader 22 or reader 24) can be used to determine the location 21 on the document 14 for the character 14 upon the first read operation and then known/predefined relative spacing between the readers 22,24 positioned in a housing 11 of the apparatus 10 can be used to determine (and therefore correlate) the same character 14 when read in the second sequential read operation. It is also recognised that the location information 21 could be determined for each read operation for each reader 22,24 and matching locations 21 could be correlated as the same character 14, therefore having related magnetic signal data 23 and optical image data 25. Alternatively, the readers 22,24 could be configured in the housing 11 for simultaneous reading of the each character 14, such that the same location 21 determined by the sensor information 18 (for example as identified/calculated by the location module 20) could be used to determine that the magnetic signal data 23 and optical image data 25 are related to the same character 14.

In any event, it is recognised that magnetic signal data 23 and the associated optical image data 25 can be obtained for each MICR character 14 on the document 12. As further described below, in the event of failure to identify the MICR character 14 by analysing the data 23 (or the data 25) (i.e. no match is obtained between any of the patterns 34 and the data 23 or no match is obtained between any of the patterns 36 and the data 25) the other corresponding data 25 (or the data 23) is matched to their corresponding patterns 36 (or 34) to determine the matching character, in order to help identify/isolate the reason(s) of the failed matching as being caused by the magnetic properties (e.g. ink amount, magnetic material amount, etc.) of the MICK character 14 and/or the optical properties (e.g. print dimensions such as character radius, line/stroke width, line/stroke height, inter-character 14 spacing, etc.).

One embodiment is for reading characters 14 printed in magnetic ink character font E-13B along the bottom of turnaround documents 12 such as bank checks. The apparatus 10 includes a MICR character reader 22 as one means for identifying the MICR characters 14 printed on the documents 12, and the optical reader 22 to assist in the identification of characters 14 whose identity cannot be accurately determined by the MICR reader 22 (e.g. the magnetic signal data 23 has magnetic signal errors therein that do not pass a magnetic standard). The optical reader 24, being additional to the MICR reader 22 in the same housing of the apparatus 10, is used in conjunction with the magnetic reader 22 to identify whether the errors in the read MICR character 14 are attributable to the optical characteristic/dimensions of the MICR character 14 and/or are attributable to the magnetic characteristics/dimensions of the MICR character 14. It is recognised that sometimes the magnetic errors of the MICR character 14 may be based on visually identifiable defects/errors in the MICR character 14 (e.g. line/stoke width/height below the corresponding threshold, etc.).

It is important to note that the readers 22,24 are both contained in the same housing 11 such that the same character 14 is read on the document 12 by both of the readers 22,24, as correlated by same location on the document 12, so as to facilitate the identification of the error type (e.g. magnetic alone, magnetic as caused by optically identifiable printing errors, optical alone, etc.). It is also recognised that the image processing of the document surface 113 (see FIG. 4) can also be performed by the same optical imager 24, for example, to provide for complete images 117 (see FIG. 5) of the documents 12.

MICR Reader 22

The MICR reader 22 is a machine that reads the magnetic ink characters 14 that are printed (e.g. using the E13B or the CMC7 fonts) on a surface of the document 12. The MICR reader 22 recognizes the magnetic waveform 200 (see FIG. 3) of each character 14 and other magnetic pattern characteristics. It is recognised that the waveform 200 can also be provided as a magnetic bitmap 200, further described below. First, the character 14 is magnetized by the MICR reader 22 write head (not shown). Then, as the character 14 passes the read head (not shown), leading edge A generates a change in magnetic flux, producing peak A of the waveform 200. There is no change in flux as the character between A and B passes the head. As trailing edge B passes the head, a change in flux is sensed producing peak B of the waveform 200.

As the document 12 enters the MICR reader 22, the heads magnetize the ferrous material in the printed characters 14 and then sense or read this magnetic field and send the characteristics signal information for the character 14 to the MICR logic board. In terms of operation of the write head, DC generated fields magnetize the E-13B magnetic ink imprinted characters 14 and the adjacent read head senses the differentiation of the magnetic field. In other words, as a character 14 passes the read head gap, a voltage is induced for each change in the amount of magnetic flux (i.e. as the document 12 passes over the read head of the reader 22, the magnetized particles in the character 14 MICR ink cause a flux change within the windings of the read head, changing the output voltage).

Assuming uniform ink strength within a character 14, the flux changes will be due to character 14 features (e.g. strokes/lines). For example, the increase in the amount of ink, such as the leading edge A of a vertical stroke/line, results in a signal of one polarity, while a decrease in ink results in a signal of the opposite polarity. Relative signal amplitude is a function of the amount of flux density change. It can be seen that the read head signal is a differentiation of the character's 14 magnetic intensity. By integrating this signal, the "character waveform" 200 is developed which indicates the total amount of ink passing the read head gap. It is this waveform that can be optionally initially analyzed and recognized through comparison to the patterns 36 by the decision logic of the MICR system 22. Characters 14 are recognized by their waveform 200 which is a function of character 14 feature but the waveform amplitude is a function of the ink signal strength. It is also recognised that the read waveform 200 can be passed as raw signal data 23 to the analysis engine 26 for subsequent comparison to the patterns 36 for each predefined waveform 200 of the patterns 36 associated with each distinct character 14. The comparison of the waveform/bitmap 200 with the magnetic patterns 36 (e.g. waveform/bitmap templates 36) to identify the actual character 14 read by the reader 22 can be referred to as a magnetic character dimension test.

In any event, the character waveform 200 can be amplitude normalized (e.g. by the reader 22 and/or the analysis engine 26) to compensate for variations in ink strength from character 14 to character 14. The character waveform 200 is then analyzed (e.g. by the reader 22 and/or the analysis engine 26) by comparing its normalized amplitude (e.g. within each of the eight blocks for E13B patterns 36) with expected values representing each of the fourteen characters stored in the patterns 36. Character 14 recognition is accomplished by finding a correlation between the normalized wave shape 200 (or magnetic bitmap 200) and one of the defined character waveform 200 (or magnetic bitmap 200) patterns 36 for a particular predefined character 14 At the end of the process, an output character code 23,30 can be generated corresponding to the best-matched pattern 36. It is recognised that the degree of correlation/matching is compared to within a certain limits/thresholds and no other pattern 36 would have been equally matched, or a reject code 23,30 is output. For example, potential magnetic signal errors can be determined by a Peak Detector utilizing a differentiator and a zero crossing detector to produce a digital signal, indicating the time when character feature changes occur. This digital signal meets a minimum width requirement to be passed and is termed 'PEAK.' The logic functions to perform horizontal location of character data, based upon the time relationship of character peaks. In experience, the stroke width of E-13B characters can vary from 8 to 15 mil. In other words, the distance count between two adjacent peaks can vary from 10 to 19 counts instead of 16 counts due to printing quality control problems. All of the above variances in magnetic signal from the magnetic standard (with respect to above or below defined thresholds/criteria) can be used to identify magnetic signal errors in the magnetic signal data 23.

It is also recognised that the comparison of the magnetic signal data 23 with the patterns 34 can be used to provide two or more potential character matches, which can be confirmed as which one is the best character match based on the comparison of the optical image data 25 with the patterns 36. Conversely, the comparison of the optical image data 25 with the patterns 36 can be used to provide two or more potential character matches, which can be confirmed as which one is the best character match based on the comparison of the magnetic signal data 23 with the patterns 34.

It is recognised that the character 14 matching can be performed by the MICR reader 22 itself and included as part of the magnetic signal data 23 and/or can be performed by the analysis engine by taking raw magnetic signal data 23 and performing matching with the patterns 34.

Reader 22 Types

Waveform readers 22 measure the magnetic signal waveform or pattern of the MICR character 14 as the documents 12 pass the read head. Waveform readers 22 can be referred to as "single slot" or "single gap" readers 22 because the read head contains one magnetically sensitive slot or gap, which covers the height of the entire character 14 string in the clear band. Each MICR character 14 that passes the read slot of the reader 22 produces a corresponding waveform signal 200. This signal is compared against the known 36 waveforms of the MICR character set to determine which character 14 was read. Waveform readers 22 are also called "DC readers," because they use a constant magnetic field to magnetize the characters. Waveform readers 22 are generally low to medium speed reading devices.

Matrix or AC readers 22 use a series of small read heads that are stacked in close proximity, each of which reads a small strip of the character 14 string. The segments of the MICR characters 14 register as binary magnetic flux transitions at each read head. These pulses are combined and used to build a two dimensional bitmap 200 for each character 14. This bitmap 200 is then compared to known bitmap patterns 36 to determine the identity of the character 14. To simplify bitmapping, readings from groups of heads can be logically combined to produce a single value. Matrix readers 22 are also called "AC readers," because they use an oscillating magnetic field to magnetize the characters 14. These oscillations cause a series of waveform peaks in a character 14 stroke, which are recorded as a binary 1 in the bitmap image 200 of the character 14.

Accordingly, the waveform 200 or bitmap 200 can be referred to generically as magnetic character data 200 for the purposes of apparatus 22 operation and configuration, such that the patterns 36 contain corresponding predefined magnetic character data for use in comparison and identification (or rejection) of characters 14 read by the MICR reader 22.

For example, the basic steps in processing the waveforms 200 from MICR characters 14 can be as follows: 1. Locate a character 14 and then accurately determine the start of the character 14. It should be recalled that the start of a character printed in the E-13B character font always starts with a positive going waveform. 2. Extract the "features" from the waveform 200 associated with a character 14 and position these features relative to the start of the associated waveform 200. Extracted features include "positive peak values", "negative peak values", and "substantially zero values" which are arranged in predetermined combinations (e.g. template patterns 34) for the characters 14 within the E-13B font. 3. Match the extracted "features" against all the templates 34 for the E-13B font. A template 34 can be define as the particular combination of positive, negative and substantially zero values for an individual character and the positions they are allowed to occupy for an individual character. 4. Apply character recognition rules to the extracted "features" to determine if the features actually match the features included in one of the templates 34 well enough to be recognized as that particular character 14.

Optical Reader 24

The optical reader 24 is used to determine the optical image data 25 of each MICR character 14 in the same location 21 as the magnetic signal data 23. Optical character recognition OCR can be employed by the reader 24 to interpret the results to the patterns 36. It is also recognised that not only are the MICR characters 14 identified by the optical reader 24, also the other optical elements 13 of the document 12 can also be identified to comprise a digitized image 117 of the document 12 (see FIG. 5) for use in analysing the compliance of one or more features 13 of the document 12 to an optical standard by the analysis engine 26, further described below.

Optical readers 22 typically use a light source and some type of photosensitive matrix array to convert an image of the MICR character 14 and other optical elements 13 into a set of electrical signals. Optical character recognition, usually abbreviated to OCR, is the mechanical or electronic translation of images of handwritten, typewritten or printed text (usually captured by a scanner) into machine-editable text. It is used to convert documents 12 into electronic files, for instance. By replacing each block of pixels that resembles a particular character (such as a letter, digit or punctuation mark) or word with that character or word, OCR makes it possible to digitize and store the identified MICR characters 14 and the other optical features 13. Optical character recognition (using optical techniques such as mirrors and lenses) and digital character recognition (using scanners and computer algorithms) are considered to include digital image processing as well.

Figure 4:
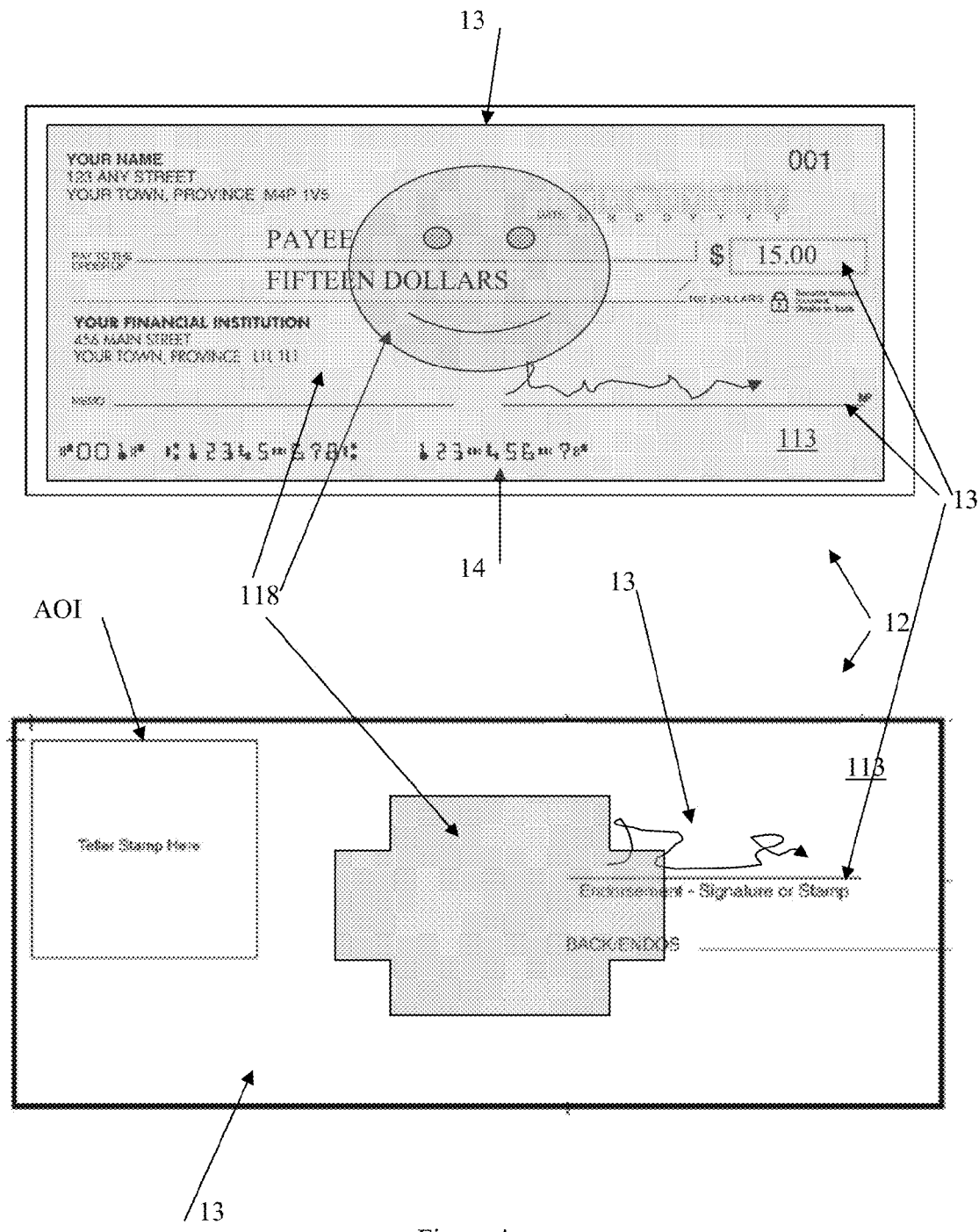
FIG. 4 is an example document as a check of the testing apparatus of FIG. 1.
Figure 5:
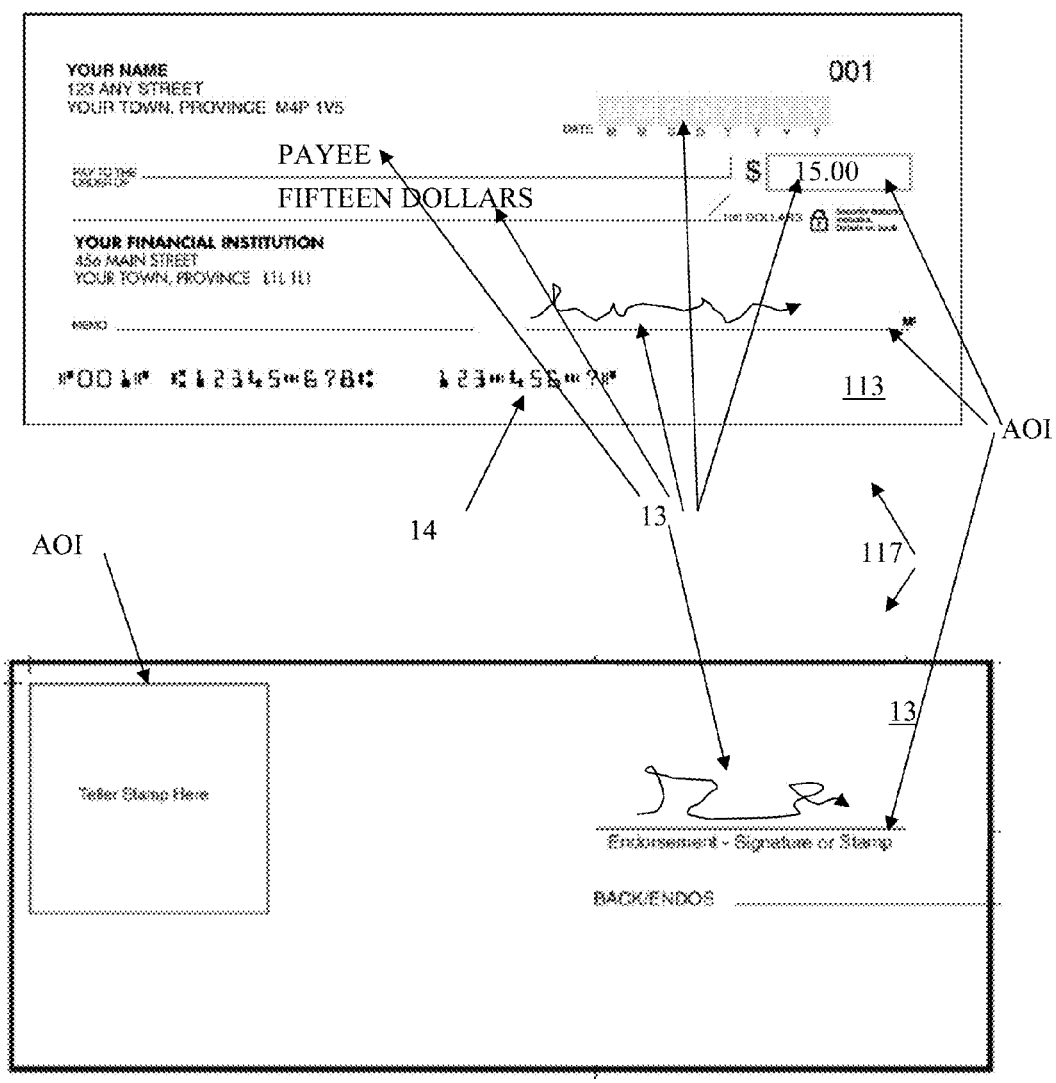
FIG. 5 shows an image of the document of FIG. 4 with background features removed.

For example, the OCR process can also include correction for background 118 (FIG. 4) images to be removed from the resulting image 117 of the document 12 (see FIG. 5). Processes for removal of the background 118 can be done through various thresholding to convert the gray scale signal to a black/white signal and analog-to-digital pixel conversion to transform the black/white signal to a series of binary pixels having values of "one", corresponding to a black picture element, and "zero", corresponding to a white picture element 117.

As a document 12 is moved past the camera 24, the entire document 12 may be imaged or only a portion of the document 12 may be imaged. FIG. 4 is a diagrammatic view of a document 12. The imaged area can includes the monetary amount 13 of the document 12, the MICR character 14 field, the bank of origin 14, check number 13,14, customer account number 14, and similar information, shown within the MICR character 14 field.

Optical image data 25 is obtained from the document 12 and processed as follows, for example. Successive vertical scans of picture elements, or pixels, are provided by the camera 24, starting at the right side of the check 12 and proceeding towards the left side thereof. In the embodiment described, camera 24 is capable of generating a resolution (e.g. greater than 0.001" sample rate). The output of camera 24 can be an analog gray scale signal provided to a line imager for digitizing and processing. The line imager can performs various processing tasks including thresholding to convert the gray scale signal to a black/white signal and analog-to-digital pixel conversion to transform the black/white signal to a series of binary pixels having values of "one", corresponding to a black picture element, and "zero", corresponding to a white picture-element. The line imager can also perform character location and formatting to isolate and refine the pixel information associated with a character 14 being imaged by camera 24, due to print contrast signals and/or background removal and other extraneous mark removal (e.g. print ink splatter). Further details are provided below with respect to an example image module 52 of the analysis engine 26, for example.

It is recognised that the character 14 matching can be performed by the optical reader 24 itself and included as part of the optical data 25 and/or can be performed by the analysis engine 26 by taking raw optical image data 25 and performing matching with the patterns 36.

For example, the formatted pixel data 25 is compared with a series of character templates 36, i.e. pixel data patterns corresponding to the various E-13B font characters, to identify a match between the pixel data pattern associated with the imaged character 25 read from document 12 and the character templates 36.

MICR Characters 14

Figure 3:
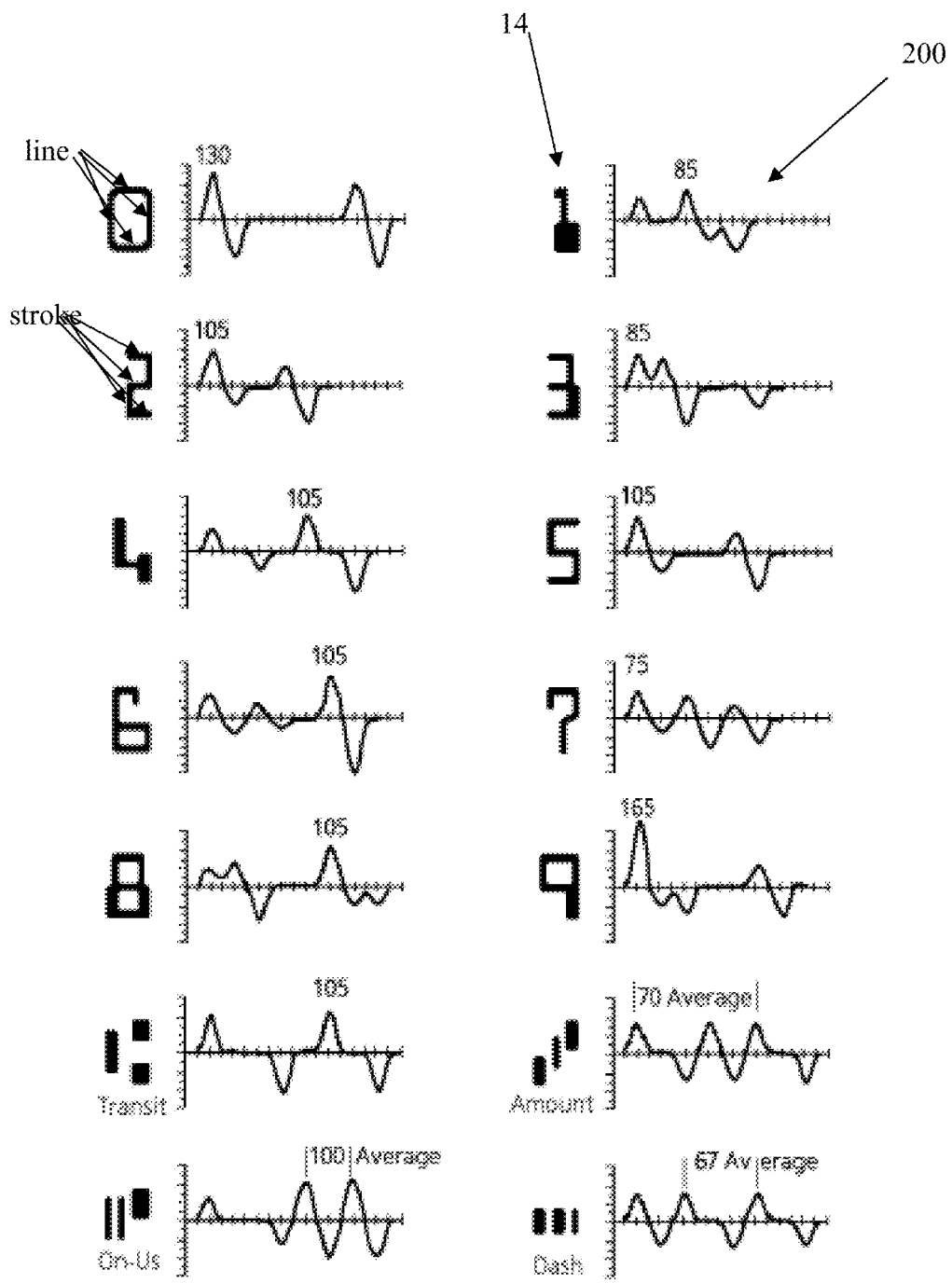
FIG. 3 shows example MICR data and corresponding magnetic signal forms of the document of FIG. 1.

Referring to FIGS. 1 and 3, Magnetic Ink Character Recognition, or MICR, is a character recognition technology adopted mainly by the banking industry to facilitate the processing of cheques 12. The reader 22 can identify each magnetized character 14 and symbol of the MICR line using logical analysis algorithms (via the patterns 34) of the electronic wave patterns 200 that the characters 14 produce.

The major MICR fonts used around the world are E-13B and CMC-7. The E-13B font (see FIG. 3) was chosen by almost all Indian, US, Canadian and UK checks 12 which now include MICR characters 14 at the bottom of the paper 12 in the E-13B font. Some countries, including France, use the CMC-7 font instead. The 14 characters of the E-13B font include the control characters bracketing each numeral block as transit, on-us, amount, and dash.

An example of the CMC-7 MICR font. has control characters after the numerals as internal, terminator, amount, routing, and an unused character. In addition to their unique fonts, MICR characters 14 are printed with a magnetic ink or toner, usually containing iron oxide. Magnetic printing is used so that the characters 14 can be reliably read 22, even when they have been overprinted with other marks such as cancellation stamps. The characters 14 are first magnetized in the plane of the paper 12 with a North pole on the right of each MICR character 14, for example. Then they are usually read with a MICR read head of the reader 22 which is a device similar in nature to the playback head in an audio tape recorder, and the letterforms' bulbous shapes ensure that each letter produces a unique waveform 200 for the character recognition system (comparison via the defined patterns 34) to provide a character result.

The specifications for producing the E13B font using magnetic ink were accepted as a standard by the American Bankers Association (ABA). Groups that set standards and dictate the design specifications for document 12 encoding, processing equipment, and quality criteria for MICR printing, as a definitive basis for determining acceptable quality of a MICR document 12.

Some of these group standards are: American Banking Association (ABA); American National Standards Institute (ANSI); United Kingdom—Association for Payment Clearing Services (APACS); Canadian Payments Association (CPA); Australian Bankers Association (ABA); International Organization for Standardization (ISO); France—L'Association Francaise de Normalisation. All of the E13B characters 14 are designed on a 7 by 9 matrix of 0.013 inch/0.33 mm squares. The minimum/threshold for character width is four squares (or 0.052 inch/1.3 mm) for the numbers 1 and 2. The maximum/threshold width is 0.091 inch/2.3 mm for the number 8, 0, and four special symbols. Concerning other thresholds, all characters except the On-Us and Dash symbols have a height of 0.117 inch/3 mm. This does not correspond to an exact point size usually specified for fonts, but is between 8 and 9 points. The height of the On-Us symbol is 0.091 inch/2.3 mm, and the dash is 0.052 inch/1.3 mm. Both heights are multiples of the basic 0.013 inch/0.33 mm unit.

Documents 12

Referring to FIGS. 1 and 4, documents 12 such as checks and deposit slips used in the banking industry, for example, have certain key data 13,14 printed on the documents 12. The key data 13 may include bank number, customer account number, document or check number, and the monetary amount of the document 12, for example, and is typically printed on the documents 12 in magnetic ink in special stylized fonts. One such stylized font, adopted by the American Banking Association, is called E-13B. FIG. 3 illustrates the E-13B numerical font characters. The documents 12 with this key data 13 thereon are processed by the testing machine 10. The document 12 processing is effected by moving the documents 12 with the key 12 and/or magnetic ink character recognition (MICR) characters 14 thereon in reading relationship with the magnetic or MICR reader 22 positioned along a document track 16 included in the machines 10. Turnaround documents 12 refer to any type of volume transaction, whether negotiable or not, that requires data capture. Familiar examples of turnaround documents 12 are: credit card invoices; insurance payment booklets; and instant rebate coupons. Turnaround documents 12 are also used in remittance processing, which is a procedure for handling items returned with a payment. MICR encoded turnaround documents 12 can enable organizations to cut their resource and equipment costs.

Examples of documents 12 can include issuing checks such as Payroll checks, Accounts payable checks, Dividend checks, Benefit checks, Drafts, Warrants, Negotiable orders of withdrawal, for example. Issuing turnaround documents 12 refer to any type of volume transaction, whether negotiable or not, that requires data capture. Familiar examples of turnaround documents are: Credit card invoices; Insurance payment booklets; and Instant rebate coupons. Turnaround documents 12 can also used in remittance processing, which is a procedure for handling items returned with a payment. MICR encoded turnaround documents 12 enable organizations to cut their resource and equipment costs. MICR is also used for printing a variety of financial forms 12 which can include: Personal checkbooks; Limited transaction checks, such as money market checks; Direct mail promotional coupons; Credit remittance instruments; and Internal bank control documents, such as batch tickets.

Referring again to FIG. 4, shown are two example paper documents (e.g. checks) 12 having a plurality of areas of interest (AOIs) 13, which are considered as the areas on a document surface 113 that contain critical data (e.g. signature) as well as interest markings IM that should be discernable in a recorded digital image 117 of the document surface 113 (see FIG. 5). In the case of where the document 12 is a check, the areas of interest AOI are such as but not limited to: Date; Payee; Numerical Amount; Legal Amount (Amount Spelled out); Signature Lines; and the MICR numbering line Area. In general, it is noted that the areas of interest AOI and the interest markings IM also contain background images 118 (e.g. pictures/images, designs, fill schemes, personal or business logo; font style; color; size and location background features and check fields—e.g. AOIs, etc.). These background images 118 must be designed such that they provide a desirable graphical design appeal of document surface 113 while at the same time do not occlude or otherwise interfere with the quality of the digital image 117 recording of the critical data located in the areas of interest AOI as well as occlude or otherwise interfere with the image quality of the interest markings IM. It is recognised that the image capturing process of the item surface 113 provides for the conversion of the item surface 113 via scanning (e.g. via the reader 24) and binary conversion (i.e. into a plurality of pixel values) of the critical data (e.g. handwriting) from the areas of interest AOI and the interest markings IM. It is also recognised that the background images 118 should not occlude the interest markings IM on the surface 113 of the document 12, such as but not limited to the MICR data, specified text (e.g. "Teller Stamp Here Box"), the dollar sign, etc. In any event, it is recognised that the background images 118 should drop out from the AOIs (so that any critical data resident in the AOIs will not be occluded) and the background data 118 should also drop out from the surface 113 areas adjacent to the interest markings IM that the interest markings IM are legible in the image 117 of the document 12.

It is recognised that the documents 12 can be manufactured using a variety of different stock materials such as but not limited to different versions of paper, etc. It is also recognised that the documents 12 can be embodied as any document that has a requirement for image quality of selected areas (e.g. AOIs) of the document surface 113, such that the selected area(s) (e.g. AOI(s), IM(s)) of the image 117 (e.g. scanned), see FIG. 5, of the document 12 satisfy specified PCS threshold(s) 20 (see FIG. 5). Examples of the documents 12 are such as but not limited to: checks; coupons; forms; and other documents 12 suitable for having the scanned image 17 (e.g. a grey scale image) recorded of the document surface 113 (e.g. front side and/or backside of the document 12).

Referring to FIG. 5, shown are example areas of interest AOI and interest markings IM for a check embodiment of the document 12, as discussed above. It is also recognised that the areas of interest AOI for a form and/or coupon 12 can be areas such as but not limited to: signature region, identification number/information; visible security feature positioned on document surface 113; logo or other visible icon(s); etc. Referring to FIG. 5, shown is the digital image 117 of the document 12 of FIG. 4, such that the background images 118 have not occluded the critical data resident in the areas of interest AOI, nor the IMs.

ERROR Types 56, 58

There are several general situations which cause problems with the reading of characters 14 which are printed in E-13B font. These optical error types 56 include: 1. Characters 14 which are not printed according to predetermined specifications. These include characters 14 with ragged edges, characters with broken elements, and characters 14 with missing elements. Even though a character 14 is printed correctly, initially, some of the situations mentioned here may develop through abusive handling of the document on which the characters 14 are printed. 2. Characters 14 with extraneous MICR ink spatter nearby. This is commonly referred to as EIF. 3. Characters 14 with pitch problems. Character 14 pitch is most easily defined as the distance between the right hand edge of one character 14 to the right hand edge of an adjacent character 14 printed in the same font.

Further, the following print quality specifications/thresholds of the optical error types 56 for MICR characters 14: Horizontal position; vertical position including permitted vertical variation from character to character and/or proper vertical placement of the entire MICR line on the document 12; skew as the rotational deviation of a character from the vertical with reference to the bottom edge of the document 12; character-to-character spacing as the distance from the right edge of one MICR character to the right edge of the next; character size; voids; or deletions as the absence of ink; extraneous ink or spots as unwanted bits of ink that result from unavoidable splatter and smear of the magnetic printing inks, which may be invisible to the unaided eye but can affect the wave patterns 200 of MICR characters 14 depending upon the spots size, quantity, and position; Debossment; and errors types 58 in Magnetic signal strength or level is the relative ability of magnetic ink characters to generate a signal in an electromagnetic sensing device.

Other example optical defects 56 are: an over/under size width of the MICR character 14; an ink void in the MICR character 14; an extraneous ink portion adjacent to the MICR character 14; an irregular radius of the MICR character 14; an over/under size height of the MICR character 14; and an irregular edge of the MICR character 14. These optical defects 56 can be associated with dimensional feature defect thresholds of the character standard as an optical standard, such that said step of determining via the patterns 36 uses one or more of the dimensional feature defect thresholds to determine the optical defect in the MICR character 14. The optical defect can also be: an extraneous ink portion adjacent to the MICR character 14; and/or improper spacing between an adjacent MICR character 14 and the MICR character 14.

The magnetic signal defect 58 can be identified in the waveform/bitmap 200, such as: improper signal strength the MICR character 14; improper number of peaks the MICR character 14; improper distance between peaks the MICR character 14; and/or improper width of a peak the MICR character 14. The magnetic defects can be associated with a dimensional feature defect threshold of the character standard as a magnetic standard, such that the step of determining via the patterns 34 uses one or more of the dimensional feature defect thresholds to determine the magnetic signal defect. The magnetic signal defect can also be: an extraneous magnetic signal data adjacent to the MICR character 14; and improper spacing between magnetic signal data of an adjacent MICR character 14 and the magnetic signal data of the MICR character 14.

It is recognised that some of the above-described error types 56, 58 which may cause misreads in the optical read 24 process may also cause misreads in the MICR reader 22, or vice versa.

Print Contrast Signal (PCS)

In optical character recognition for the present apparatus 10, PCS is a measure of the contrast between a selected feature 13 (e.g. target portion) of the imaged document 12 and a defined region of the imaged document 12 adjacent/around the selected feature 13 (e.g. a series of background image 118 pixels adjacent to the target pixel). For example, in the case of a target portion located in the dollar sign area (e.g. IM) of the check 12, the desired PCS will be large (e.g. the dollar sign should have a high contrast as compared to its surrounding background image 118). In the case of selected AOIs (e.g. Payee, Signature, etc.), the PCS should have a negligible value (e.g. the AOIs should be blank when the background image 118 is digitally removed from the image 117 of the document 12). In the case of the endorsement line and phrase "Endorsement signature or Stamp" (e.g. IMs), the PCS should be 0.60 minimum (e.g. the endorsement line and indication IM should be discernable from the background image 118 in the digital image 117 of the document 12).

Contrast can be defined as the range of optical density and/or tone on a document 12 as the extent to which adjacent areas (e.g. background image 118 adjacent to printed/written critical data to be input in the AOIs, background image 118 adjacent to IM) on the document 12 differ in brightness. It is recognised that the degree of difference in lightness, brightness (i.e. contrast) between the AOIs/IMS and the adjacent background images 118 makes the critical data (when input) and the IMs more or less distinguishable in the digital image 117 of the document 12. For example, the print contrast signal (PSC) can be calculated as =100% (defined region reflectance—selected target portion reflectance)/(defined region reflectance). This means that measured reflectance (Rr) of a dynamically selected defined region of the document image 117 can be compared with the measured reflectance (Rt) of the selected target portion of interest, i.e. PCS=(Rr−Rt)/Rr. Examples of PCS thresholds 20 are: 0.3 maximum for all target portions located within the CAR AOI; 0.6 minimum for all MICR characters (i.e. PCS with respect to the clear band background around the MICR characters); 0.6 minimum for the dollar sign; 0.3 maximum for the MICR clear band abound the MICR characters; etc.

Reflectance can be defined as the amount of light reflected from each particular marking/indication (e.g. background image 118, IM, etc.) that would be present on the surface 113 of the tested document 12. For example, for checks 12, the amount of light is reflected from each particular marking sample of paper and/or ink. An example reflectance scale is a range of 0% to 100%, where 0% is absolute black (considered the darkest colour/shade) and 100% is maximum diffuse reflectance of the entire incident light (considered the lightest colour/shade). For example, the ANSI standard for physical checks 12 for reflectance is specified at not less than 40% in all areas of interest AOI with the exception of the convenience amount area (i.e. CAR which contains the numerical amount), which is not less than 60%. If the background features 118 are recorded in the image 117 of the document 12 as too dark (i.e. reflectance is too low in the AOIs), the critical data could drop out (e.g. be occluded) due to insufficient contrast between the overlapping background image 118 and critical data in the image 117 taken of the document 12. The Convenience Amount Recognition (CAR) is the numerical amount area AOI. It is critical that the banks can read the CAR rectangle and its corresponding print contrast signal (PCS) to assure the printed rectangle dropped out and did not interfere with automatic machine recognition of handwritten amounts in bank imaging equipment (not shown). It is recognised that low background reflectance causes low contrast and unintended dropout of vital information (e.g. critical data, IMs), while high contrast background patterns 118 can cause random background clutter to remain in the binary images 117 that renders critical data (e.g. handwriting) and/or IMs ambiguous at best.

Referring to FIG. 5, shown is an example of the captured image 117 having an example target portions 13 containing individual pixel(s) having no background features 118. It is recognised that the pixels of the image 117 can be represented as a collection/distribution of reflectance values (e.g. a reflectance map) containing same/different colors having one or more shades—e.g. according to a single colour scale such as but not limited to grey scale). For example, the colours of the background features 118 present item 12 can all be converted to a representative shade in a single colour scale (e.g. grey, brown, red, etc. scale) for use in determination of the colours respective reflectance value Rb in the items image 117 (see FIG. 5), for example as obtained from the image capture device 24. For example, the single colour scale can be a grey scale having 256 shades of grey, which are then used as a basis for conversion of the image 117 into the binary image (e.g. black or white). Further, it is recognised that the reflectance map can be represented in a single and/or multiple colour scales, as desired, such that the reflectance map contains a plurality of reflectance values having a greater resolution (e.g. greater number of potentially different reflectance values—e.g. on a pixel per pixel basis) of the representative surface 113 of the image 117, as compared to the resolution (e.g. number present on the surface 113) of the features 13,14 printed/written on the document surface 113.

Background clutter can be measured by creating the binary image 117 of the document 12 (e.g. not containing critical data input into the AOIs), then converting the image 117 from gray scale to black-and-white using a standardized conversion process as is known in the art, and then measuring the clusters of black pixels (paxel count) which remain after conversion. As part of tested image 117 quality for documents 12, specifically the requirements (e.g. ANSI) focus on the areas of interest AOI for background drop out, such that the background features 118 will not occlude or otherwise adversely affect the image quality of the critical data resident in the areas of interest AOI. As mentioned above, the paxels are formed in the image 117 through low reflectance of the background features 118 and/or the document material in the areas of interest AOI. It is considered that the critical data 13,14 on the surface 113 of the document 12 should show up in the image 117 as darker than the surrounding background features 118 that may overlap the areas of interest AOI.

The results of the PCS calculation described above could be an indication of where the formation of dark (e.g. black) pixels, paxels, and/or paxel strings/combinations in the image 117 would occur that would make it difficult for manual (by person) and/or automatic (e.g. OCR) recognition/identification/detection of the critical data 13,14 in the AOIs and/or the IMS of the image 117. One example of the paxel is a 0.01" by 0.01" block of black pixels (e.g. an example smallest area of a physical document 12 considered in capturing the electronic image 117. The paxel (e.g. a grouping of pixels) has to be complete (e.g. 66%), or at least a specified number of pixels (e.g. 6 of 9 pixels) in the paxel. For example, it has been found that individual pixels may not constitute a legibility problem, but 0.01" by 0.01" blocks of problematic legibility does, especially when joined together in the string of paxels.

It is recognised that any target portions of the surface 113 that have a calculated PCS values not satisfying the specified PCS threshold(s) (for the corresponding locations on the surface 113 of the document), these target portions could be prone to forming the black pixels or grouping of pixels/paxels and therefore important information (i.e. critical data 13,14, IMs) risk being occluded in the image 117 created from the respective document 12. In other words, those target portions that have PCS values that satisfy the specified PCS threshold(s) can be considered by the document 12 designer as having design parameters that would inhibit adverse image quality of critical data 13,14 and/or IMs in the recorded digital image 117 of the surface 113 of the document 12.

Analysis Engine 26

Figure 6:
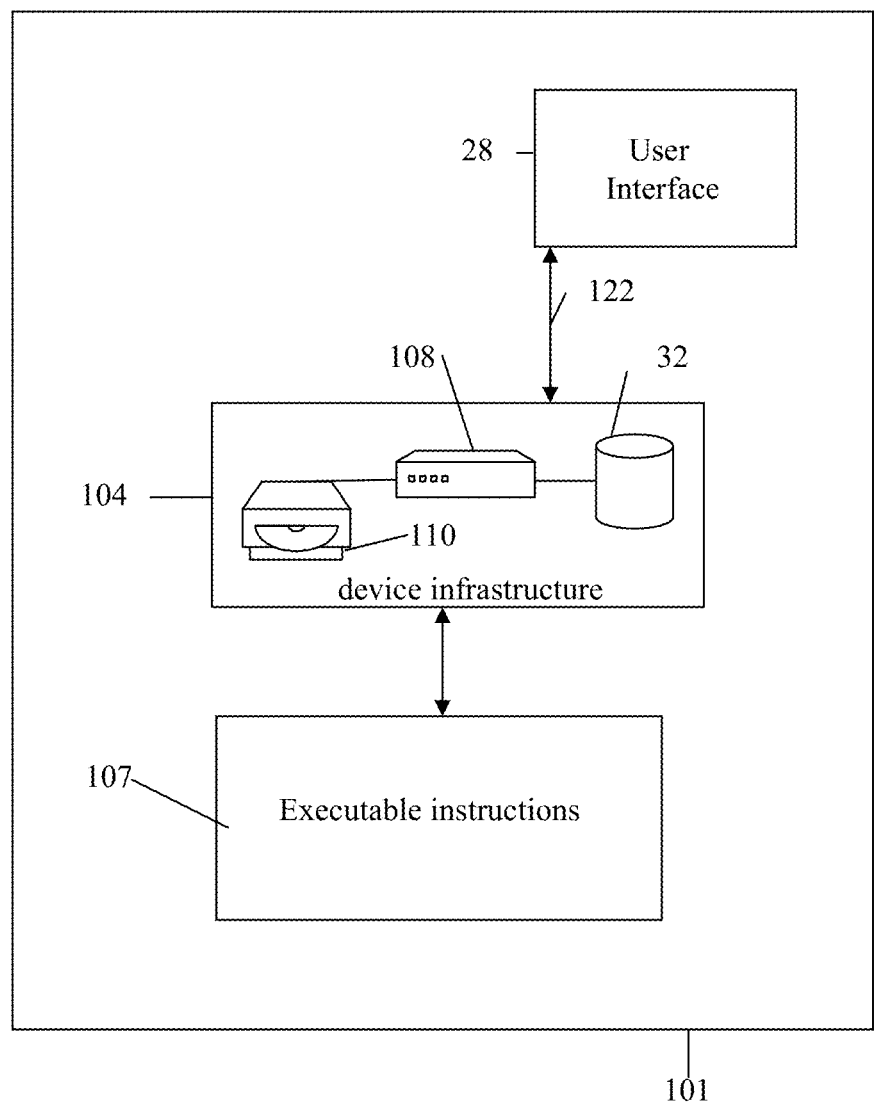
FIG. 6 shows an example embodiment of a computing system for the document testing apparatus of FIG. 1.

Referring to FIG. 6, shown is the analysis engine 26 having an optional optical module 50, an optional magnetic module 52, a correlation module 54. The optical module 50 is configured to perform the conversion of the optical data 25 to account for print contrast operations as discussed above for both the MICR characters 14 and the other optical elements 13 present on the surfaces 113 of the document 12. Further, the optical module 50 can also perform the matching of the raw optical image data 25 obtained from the optical reader 24 and compared to the patterns 36 as discussed above, in the event that the optical reader 24 is not configured to perform the matching. Further, the magnetic module 52 can also perform the matching of the raw magnetic signal data 23 obtained from the magnetic reader 22 and compared to the patterns 34 as discussed above, in the event that the magnetic reader 22 is not configured to perform the matching.

The correlation module 54 is configure to compare the matched/unmatched signal data 23 with the matched/unmatched optical data 25 in order to determine which of the error types (as discussed above by example) of the magnetic signal data error types 58 and/or the optical image data error types 56 can be attributed to the mismatch or match failure performed by the modules 50,52 and/or corresponding readers 22,24. For example, the error types 56,58 can be stored in the memory 32 and be used by the correlation module 54 identify the errors detected in the matching operation of the readers 22,24 and/or modules 50,52. For example, the correlation module 54 can compare optical defects 56 identified for one or more lines/strokes for an identified character 14 with the corresponding peak amplitude and/or peak width for the same line/stroke. In this manner, any errors 58 in the magnetic signal data 23 (e.g. peaks too small, peaks too narrow, adjacent peaks too close to one another, etc.) can be identified as having a correlation (or not having a correlation) with the defects 56 identified in the print features of the character 14.

Alternatively, for example, the correlation module 54 can compare magnetic defects 58 (e.g. improper peak amplitude and/or improper peak width and/or improper peak spacing) identified for one or more lines/strokes for an identified character 14 with the corresponding optical defects 56 for the same line/stroke. In this manner, any errors 56 in the optical image data 25 (e.g. lines/strokes too narrow/wide, adjacent lines/strokes too close to one another, etc.) can be identified as having a correlation (or not having a correlation) with the defects 58 identified in the magnetic features 200 of the character 14.

For example, it is recognised that a too small peak amplitude 58 for a particular line/stroke of the identified character 14 may be correlated to (e.g. indicative of the reason for) the fact that there is also an identified void 56 in the same line/stroke of the identified character 14 (e.g. indicating that the undervalued peak 58 is caused by the undervalued amount of magnetic ink caused by the void 56). Alternatively, the case where there is a too small peak amplitude 58 for a particular line/stroke of the identified character 14 may be uncorrelated to the fact that there is no identifiable void or undersized line/stroke thickness defect 56 in the same line/stroke of the identified character 14 (i.e. the defect 58 may be caused by the improper distribution and/or concentration in the printed ink for the respective line/stroke but is not due to the absence of the ink and corresponding contained magnetic material). It is recognised that the above are just some examples of the correlation and/or lack or correlation between defects 56,58 for use as indicators of the failure to detect the character 14 by one of the readers 22,24.

Also, it is recognised that the first reader 22 may not completely fail to identify the character 14 itself but will still give the identified character 14 a fail, against the template 34,36 of the corresponding character 14, as the quality of the match does not meet the magnetic/optical standard of the template 34,36. For example, the reader 22 could successfully identify the number "3" as the character 14 through comparison of the magnetic signal data 23 with the waveform/bitmap 200 for the number "3", however the quality of the match (e.g. all of the peaks are present but the spacing between peaks and/or the amplitude of one or more peaks do not meet the standard provided by the "3" pattern 34). For example, the reader 24 could successfully identify the number "3" as the character 14 through comparison of the optical image data 25 with the optical character template 36 for the number "3", however the quality of the match (e.g. all of the strokes are present but the spacing between strokes and/or the thickness of one or more strokes do not meet the standard provided by the "3" pattern 36). Accordingly, it is recognised that failure of the match does not necessarily mean that the reader 22,24 completely failed to identify the character 14 uniquely from all other potential characters 14 of the patterns 34,36, rather the character 14 was identified correctly but still did not pass (i.e. failed) one or more standards for one or more dimensional features of the particular template 34,36.

It is also recognised that the comparison of the magnetic signal data 23 with the patterns 34 can be used to provide two or more potential character 14 matches, which can be confirmed as which one is the best character 14 match based on the comparison of the optical image data 25 with the patterns 36. Conversely, the comparison of the optical image data 25 with the patterns 36 can be used to provide two or more potential character 14 matches, which can be confirmed as which one is the best character 14 match based on the comparison of the magnetic signal data 23 with the patterns 34. In this case, the inability of one of the readers 22,24 to identify a unique match between the read character 14 and the corresponding patterns 34,36 (to identify positively only one character 14) can also be considered as a failure to determine a match between the character 14 and the respective patterns 34,36.

Example Operation 300 of the Apparatus 10

Figure 2:
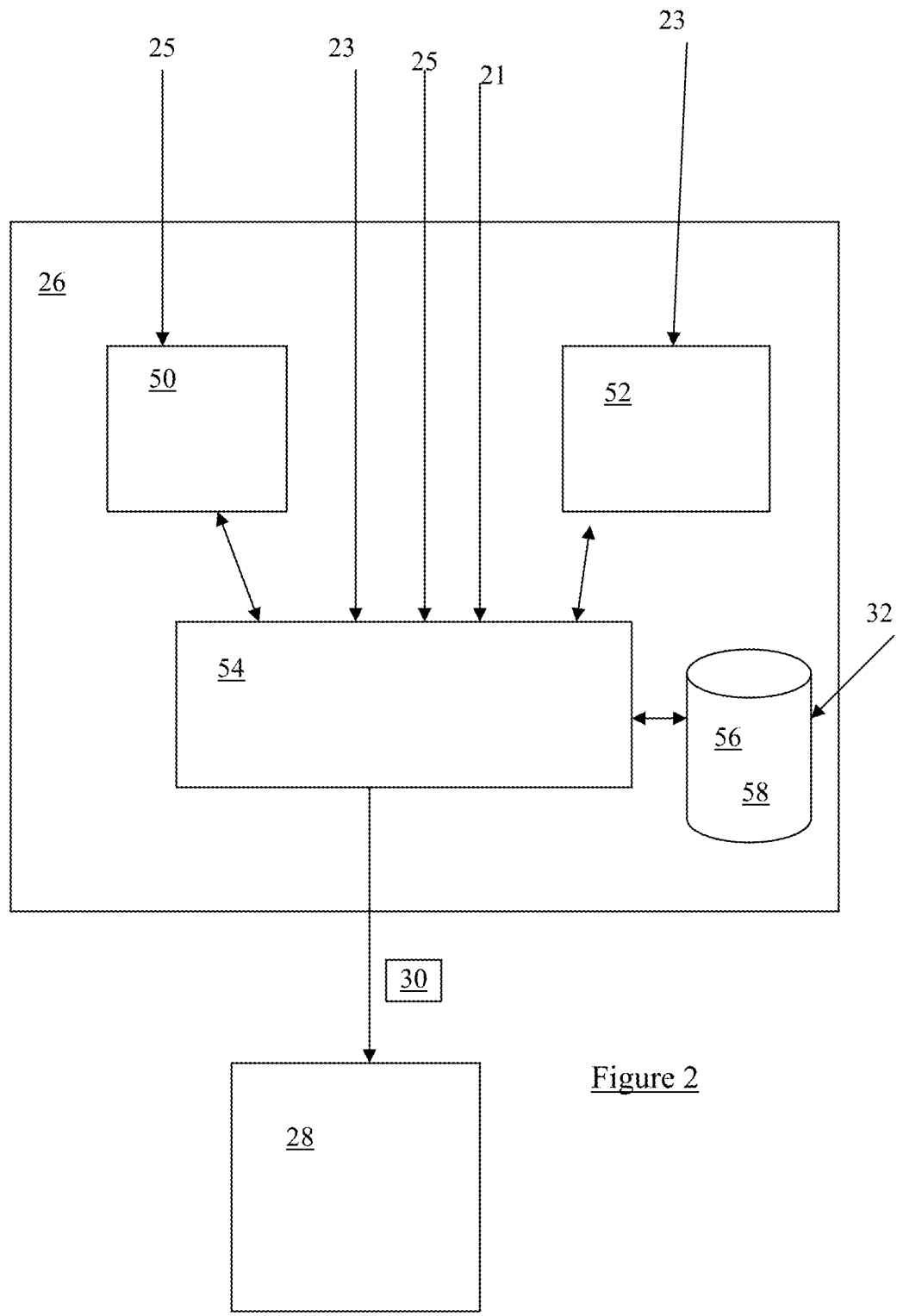
FIG. 2 shows an example analysis engine of the apparatus of FIG. 1.
Figure 7:
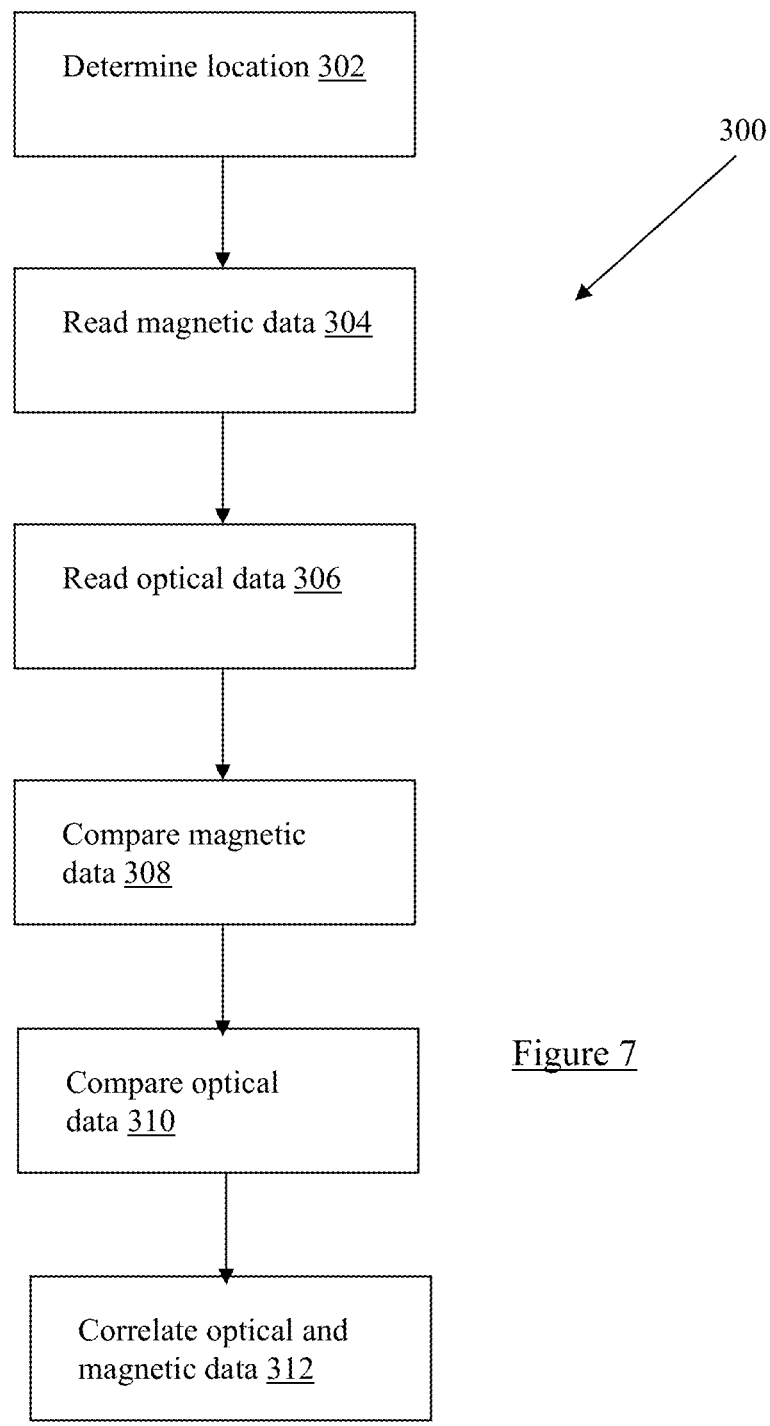
FIG. 7 shows a block diagram of an example operation of the document testing apparatus of FIG. 1.

Referring to FIGS. 1,2,7, shown is the operation 300 of the apparatus 10 for testing a magnetic ink character recognition (MICR) character 14 printed on a document 12 for compliance with a character standard. At step 302, the module 20 obtains/calculates a location associated with the MICR character 14 on the document 12. At step 304, the reader 22 obtains a magnetic signal data 23 indicative of dimensional features (e.g. lines/strokes/line/stroke spacings) of the MICR character 14 associated with the location. At step 306, the reader 24 obtains optical image data 25 indicative of the dimensional features (e.g. lines/strokes/line/stroke spacings) of the MICR character 14 associated with the location. At step 308, the reader 22 and/or the module 50 compares the magnetic signal data 23 against a plurality of magnetic signal templates 34 and fails to determine a matching character of the MICR character 14, such that each of the plurality of magnetic signal templates 34 is associated with a unique character 14 of a set of characters 14. At step 310, the reader 24 and/or the module 52 compares the optical image data 25 against a plurality optical image templates 36 to determine the matching character 14 of the MICR character 14. At step 312, the correlation module 54 determines at least one optical defect 56 of the dimensional features of the matching character 14 from the optical image data 25 indicative of the failure to determine the matching character by the comparison of the magnetic signal data 23.

Alternatively, the operation 300 steps can be obtaining a location associated with the MICR character 14 on the document 12; obtaining a magnetic signal data 23 indicative of dimensional features of the MICR character 14 associated with the location; obtaining optical image data 25 indicative of the dimensional features of the MICR character 14 associated with the location; comparing the optical image data 25 against a plurality of optical image templates 36 and failing to determine a matching character of the MICR character 14, such that each of the plurality of optical image templates 36 is associated with a unique character of a set of characters; comparing the magnetic signal data 23 against a plurality magnetic signal templates 34 to determine the matching character of the MICR character 14; and determining at least one magnetic signal defect 58 of the dimensional features of the matching character 14 from the magnetic signal data 23 indicative of the failure to determine the matching character 14 by the comparison of the optical image data 25.

Example of Apparatus 10

Referring to FIG. 6, a computing device 101 of the apparatus 10 can have a user interface 28, coupled to a device infrastructure 104 by connection 122, to interact with a document tester (not shown). The user interface 28 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 104.

Referring again to FIG. 6, operation of the device 101 is facilitated by the device infrastructure 104. The device infrastructure 104 includes one or more computer processors 108 and can include an associated memory 32 (e.g. a random access memory). The computer processor 108 facilitates performance of the device 101 configured for the intended task (e.g. of the respective module(s) 50,52,54,20, sensors 18, document transport mechanism 16 and/or configured readers 22,24) through operation of the user interface 102 and other application programs/hardware 107 of the device 101 by executing task related instructions. These task related instructions can be provided by an operating system, and/or software applications 107 located in the memory 32, and/or by operability that is configured into the electronic/digital circuitry of the processor(s) 108 designed to perform the specific task(s). Further, it is recognized that the device infrastructure 104 can include a computer readable storage medium 110 coupled to the processor 108 for providing instructions to the processor 108 and/or to load/update the instructions 107. The computer readable medium 110 can include hardware and/or software such as, by way of example only, magnetic disks, magnetic tape, optically readable medium such as CD/DVD ROMS, and memory cards. In each case, the computer readable medium 110 may take the form of a small disk, floppy diskette, cassette, hard disk drive, solid-state memory card, or RAM provided in the memory module 32. It should be noted that the above listed example computer readable mediums 110 can be used either alone or in combination.

Further, it is recognized that the computing device 101 can include the executable applications 107 comprising code or machine readable instructions for implementing predetermined functions/operations including those of an operating system and respective module(s) 50,52,54,20, sensors 18, document transport mechanism 16 and/or configured readers 22,24, for example. The processor 108 as used herein is a configured device and/or set of machine-readable instructions for performing operations as described by example above. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the apparatus 10 may be implemented in hardware, software or a combination of both. Accordingly, the use of a processor 108 as a device and/or as a set of machine-readable instructions is hereafter referred to generically as a processor/module for sake of simplicity. Further, it is recognised that the apparatus 10 can include one or more of the computing devices 101 (comprising hardware and/or software) for implementing the functionality, as desired.

We claim:

1. A method for testing a magnetic ink character recognition (MICR) character printed on a document for compliance with a character standard, the method comprising the steps of:

obtaining a location associated with the MICR character on the document;

obtaining a magnetic signal data indicative of dimensional features of the MICR character associated with the location;

obtaining optical image data indicative of the dimensional features of the MICR character associated with the location;

comparing the optical image data against a plurality of optical image templates and failing to determine a matching character of the MICR character, such that each of the plurality of optical image templates is associated with a unique character of a set of characters;

comparing the magnetic signal data against a plurality magnetic signal templates to determine the matching character of the MICR character; and determining at least one magnetic signal defect of the dimensional features of the matching character from the magnetic signal data indicative of the failure to determine the matching character by the comparison of the optical image data;

wherein the optical image data and the magnetic signal data are obtained from corresponding readers located in the same housing.

2. The method of claim 1, wherein device for obtaining the optical image data is selected from the group consisting of: a scanner and a camera.

3. The method of claim 2, wherein a type of the at least one magnetic signal defect is selected from the group consisting of: improper signal strength the MICR character; improper number of peaks the MICR character; improper distance between peaks the MICR character; and improper width of a peak the MICR character.

4. The method of claim 3, wherein a dimensional feature defect threshold of the character standard as a magnetic standard is associated with each type of the at least one magnetic signal defect, such that said step of determining uses one or more of the dimensional feature defect thresholds to determine the magnetic signal defect.

5. The method of claim 2, wherein the at least one magnetic signal defect is selected from the group consisting of: an extraneous magnetic signal data adjacent to the MICR character; and improper spacing between magnetic signal data of an adjacent MICR character and the magnetic signal data of the MICR character.

6. The method of claim 5, wherein a dimensional feature defect threshold of the character standard as a magnetic standard is associated with each type of the at least one magnetic signal defect, such that said step of determining uses one or more of the dimensional feature defect thresholds to determine the magnetic signal defect.

7. The method of claim 2, wherein the magnetic signal data is obtained from a DC reader or an AC reader.

8. The method of claim 2 further comprising the step of displaying the matching character of the MICR character and displaying the at least one magnetic signal defect on a display of a user interface.

9. The method of claim 8 further comprising the step of reprinting the MICR character on a new document without the at least one magnetic signal defect, obtaining a new optical image data indicative of dimensional features of the MICR character, and comparing the new optical image data against the plurality of optical image templates to determine the matching character of the MICR character, such that each of the plurality of optical image templates is associated with the unique character of the set of characters.

10. The method of claim 9, wherein the new document is a portion attached to the document.

11. The method of claim 1, wherein the failing is caused by one or more defects found in the optical image data rather than the ability to uniquely identify the character from the optical image templates.

12. An apparatus for testing a magnetic ink character recognition (MICR) character printed on a document for compliance with a character standard, the apparatus comprising:

a housing;

a location module to obtain a location associated with the MICR character on the document associated with a document transport mechanism in the housing for providing relative movement between a plurality of readers and the document;

an optical reader of the plurality of readers in the housing to obtain optical image data indicative of the dimensional features of the MICR character associated with the location and to compare the optical image data against a plurality of optical image templates and failing to determine a matching character of the MICR character, such that each of the plurality of optical image templates is associated with a unique character of a set of characters;

a magnetic reader of the plurality of readers in the housing to obtain a magnetic signal data indicative of dimensional features of the MICR character associated with the location and to compare the magnetic signal data against a plurality magnetic signal templates to determine the matching character of the MICR character; and a correlation module to determine at least one magnetic signal defect of the dimensional features of the matching character from the magnetic signal data indicative of the failure to determine the matching character by the comparison of the optical image data;

wherein the optical image data and the magnetic signal data are obtained from the corresponding readers located in the same housing.

* * * * *